United States Patent [19]

Shima

[11] Patent Number: 4,665,432

[45] Date of Patent: May 12, 1987

[54] VIDEO CONTOUR CORRECTION SYSTEM

[75] Inventor: Hideaki Shima, Utsunomiya, Japan

[73] Assignee: Sharp Kabushiki Kaisha, Osaka, Japan

[21] Appl. No.: 696,088

[22] Filed: Jan. 29, 1985

[30] Foreign Application Priority Data

| Jan. 30, 1984 | [JP] | Japan | 59-16750 |
| Feb. 3, 1984 | [JP] | Japan | 59-18930 |
| Mar. 30, 1984 | [JP] | Japan | 59-64997 |
| Mar. 30, 1984 | [JP] | Japan | 59-64998 |

[51] Int. Cl.$^4$ .................................... H04N 5/208
[52] U.S. Cl. ..................... 358/166; 358/37; 358/180
[58] Field of Search ............... 358/166, 180, 183, 185, 358/22, 37

[56] References Cited

U.S. PATENT DOCUMENTS

| 2,678,964 | 5/1954 | Loughlin | 358/166 |
| 3,949,166 | 4/1976 | Fuse | 358/166 X |
| 4,183,064 | 1/1980 | Sahara et al. | 358/166 X |
| 4,190,785 | 10/1979 | Yoshida et al. | 358/166 X |
| 4,295,164 | 10/1981 | Rauser | 358/166 |

Primary Examiner—James J. Groody
Assistant Examiner—E. Anne Toth
Attorney, Agent, or Firm—Birch, Stewart, Kolasch & Birch

[57] ABSTRACT

A video contour correction system for a video display unit consists of an auxiliary deflection coil having its coil axis parallel with the axis of the horizontal deflection coil of the cathode-ray tube, a differentiating circuit for detecting the primary differential waveform of a video signal and an amplification circuit for amplifying the output of the differentiating circuit. The output current of the amplification circuit is supplied to the auxiliary deflection coil so that the magnetic field produced by said auxiliary deflection coil is superposed on the horizontal deflection magnetic field produced by said horizontal deflection coil, thereby improving the border contrast of the picture.

5 Claims, 21 Drawing Figures

VIDEO CONTOUR CORRECTION SYSTEM

BACKGROUND OF THE INVENTION

The present invention relates to a video contour correction system for a video display unit such as television. In a system which presents a picture on a cathode-ray tube, when the acute rising and falling edges of a video signal are rounded as shown in FIG. 1(A), the border contrast of the picture produced by the video signal is dimmed, resulting in a fuzzy picture. Conventionally, to overcome this problem, the frequency characteristics of the video circuit are changed so that the rising and falling edges of the video signal have preshoots and overshoots shown in FIG. 1(B). Thus, the signal waveform is corrected to improve the apparent contrast at the picture border. This method had a disadvantage in that it broadens the picture width or, that when the electron beams were intensified at the preshoots and overshoots, the electron beam focus was dimmed.

SUMMARY OF THE INVENTION

The object of this invention is to present a video contour correction system for a video display unit, which system provides a high quality video picture by correcting fuzzy picture contour caused by rounded video signals.

Another object of this invention is to present a video contour correction system for a video display unit, which system improves or modifies the border contrast of the picture.

A further object of the invention is to present a video contour correction system for a video display unit, which system provides a video picture with improved border quality without producing a wider picture or a fuzzy electron beam focus.

A still further object is to present a video contour correction system for a video display unit, which system changes the luminance at the picture border by altering the horizontal speed of the electron beam without modifying the video signal itself so that the border contrast of the picture is corrected.

Another object is to present a video contour correction system, in which correction of the picture border contrast can be terminated at any optional point on the border.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To obtain the picture with improved border contrast, the video contour correction system according to this invention comprises an auxiliary deflection coil with its axis parallel to that of the horizontal deflection coil of the CRT, a differentiating circuit for detecting the primary differential waveform of a video signal and an amplification circuit for amplifying the output from said differentiating circuit, and is characterized in that the output current of said amplification circuit is supplied to said auxiliary deflection coil so that a magnetic field proportional to the primary differential waveform of said video signal is superposed on the horizontal deflection magnetic field produced by said horizontal deflection coil. To obtain the color picture with improved border contrast, the multi-color video contour correction system, another example of the present invention, comprises an auxiliary deflection coil with its axis parallel to that of the horizontal deflection coil of the CRT, an OR circuit whose inputs are the three primary color signals that define color video signals, a differentiating circuit for differentiating the output signals of the OR circuit and an amplification circuit for amplifying the outputs of the differentiating circuit, and is characterized in that the output current of said amplification circuit is supplied to said auxiliary deflection coil so that the magnetic field proportional to the output signal of said differentiating circuit is superposed on the magnetic field produced by said horizontal deflection coil.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1A:
FIG. 1(A) and FIG. 1(B) is a view illustrating a video signal correction method employed in the conventional art.
Figure 1B:
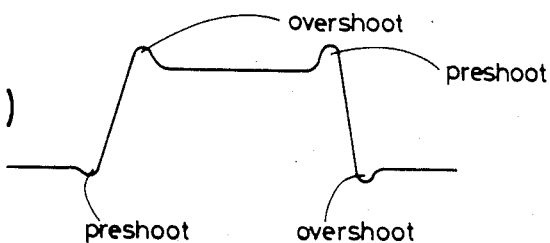
Figure 2:
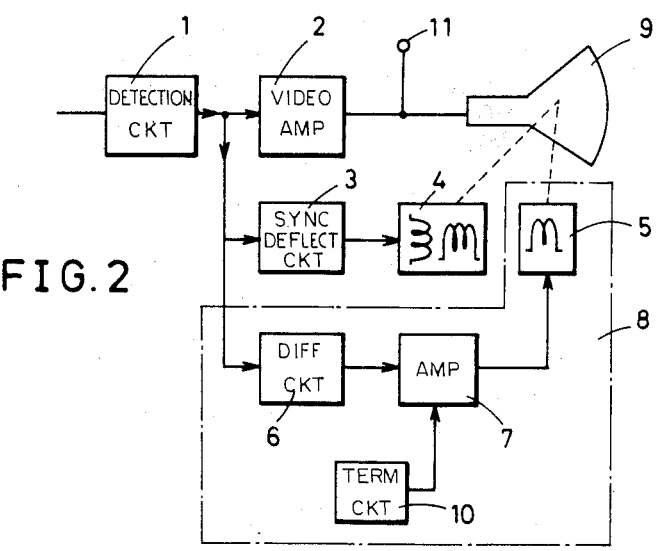
FIG. 2 is a block construction diagram in which a video contour correction system as an example of the present invention is applied to the video display circuit.

FIG. 2 is a block diagram showing the video contour correction system, an example of the present invention, being applied to the video display circuit in a video receiver.

The detection circuit 1 separates the input carrier wave into a video signal and horizontal and vertical synchronizing signals and outputs them. The video signal is amplified in the video signal amplification circuit 2 and input into the cathode-ray tube 9 for controlling the intensity of electron beams. Meanwhile, the horizontal and vertical synchronizing signals are fed into the synchronous deflection circuit 3 which outputs horizontal and vertical deflecting currents according to said synchronizing signals. The horizontal and vertical deflecting currents are supplied to the deflection coil unit 4 for producing horizontal and vertical deflection magnetic fields which sweep the electron beams in the cathode-ray tube 9. To this ordinary video display circuitry without video contour correction means is added the video contour correction system 8, an example of the present invention, which is composed of a differentiating circuit 6, an amplification circuit 7, an auxiliary horizontal deflection coil 5 and a video correction terminating circuit 10, as shown in FIG. 2.

The differentiating circuit 6 differentiates a video signal output from the detection circuit 1. The differentiated signal output from the differentiating circuit 6 is then fed to the amplification circuit for amplification, and supplied to the auxiliary deflection coil 5 which is arranged coaxially (in parallel) with the horizontal deflection coil contained in the deflection coil unit 4.

Figure 3:
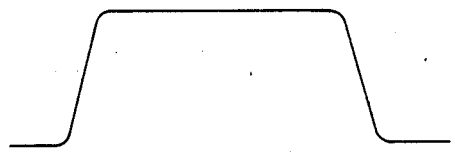
FIG. 3(A–E) is a view explaining the operation of the example in FIG. 2.
Figure 3:
Figure 3:
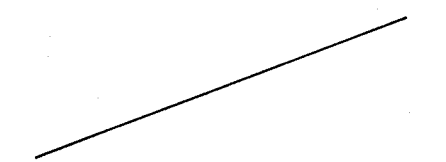
Figure 3:
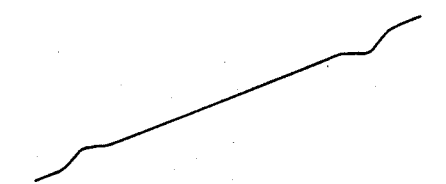
Figure 3:
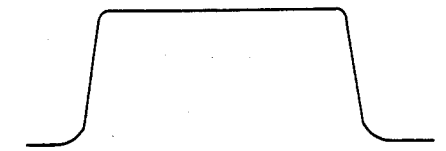

In the construction described above, when the detection circuit 1 outputs the video signal shown in FIG. 3(A), the differentiating circuit 6 differentiates the waveform of the signal to produce a differentiated signal shown in FIG. 3(B). The differentiated signal is amplified in the amplification circuit 7 and supplied to the auxilliary horizontal deflection coil 5. Meanwhile, the synchronous deflection circuit 3 is triggered by a horizontal synchronizing signal (not shown) added immediately before the video signal so that it supplies the horizontal deflection coil in the deflection coil unit 4 with a horizontal deflecting current which varies linearly with respect to time. FIG. 3(C) shows the variation with time of the horizontal deflection magnetic field by the horizontal deflecting current or the horizontal deflection coil. Accordingly, the total horizontal deflection magnetic field applied to the cathode-ray tube 9 is the sum of the magnetic field produced by the horizontal deflection coil in the deflection coil unit 4 and the magnetic field produced by the auxiliary deflection coil 5. The time course change of the total magnetic field is shown in FIG. 3(D), from which it is obvious that the horizontal deflecting speed of the video signal in the rising portion is very fast at the first half and very slow at the latter half. Correspondingly, as obvious from the variation with time of the electron beam intensity shown in FIG. 3(E), the changing speed of the intensity is slow at the first half but very fast at the latter half of the rising portion of the video signal. In this way, the end portion of the picture correponding to the rising portion of the video signal has a strong contrast. The falling portion of the video signal has a similar characteristic, except that the attenuation speed of the electron beam intensity is fast at the first half and slow at the latter half of the falling portion of the video signal, thereby intensifying the border contrast of the picture.

The differentiating circuit 6 used in the above example will be explained in the following.

Figure 4:
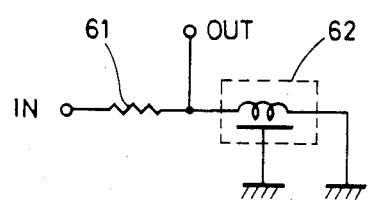
FIG. 4 is a construction diagram of the differentiating circuit used in the example in FIG. 2.
Figure 5:
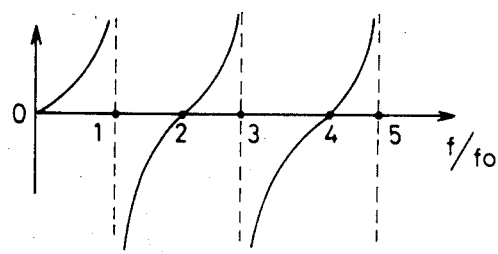
FIG. 5 is a characteristic view of the retardation element used in said differentiating circuit.
Figure 6:
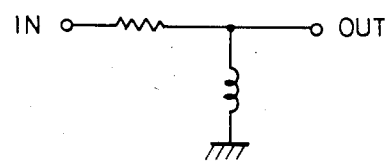
FIG. 6 is an equivalent circuit of the differentiating circuit in FIG. 4.

As shown in FIG. 4, the differentiating circuit 6 consists of a signal retardation element 62 comprising a delay line, and a resistor 61. An end of the retardation element 62 is grounded. A differentiated signal is inputted through the resistor 61 to the other end of the element 62. Output is taken out from the contact between the resistor 61 and the retardation element 62. With its end grounded, the retardation element forms a resonance circuit having multiple resonance points at the frequency $(2n+1)f_O$ with $\lambda_O/4$ frequency peculiar to the element as $f_O$, as shown in FIG. 5. In FIG. 5, the horizontal axis indicates the relative frequency to $f_O$ or $f/f_O$, and the vertical axis indicates the complex impedance. Within the range $0 < f/f_O < 1$, for example, the complex impedance is reactive. Under such a condition, the circuit shown in FIG. 4 is replaced by an equivalent circuit shown in FIG. 6 which is a differentiating circuit. Therefore, the circuit in FIG. 4 functions as a differentiating circuit at all times, if adequate value is selected for $f_O$ of the retardation element according to the repetition cycle of the video signal. It is possible, of course, to use an ordinary lumped constant circuit element instead of the distributed constant circuit element such as the retardation element for constructing the differentiating circuit 6 in FIG. 2. The circuit composed of the ordinary lumped constant circuit element involves increased number of circuit elements and requires complicated design consideration in determining the resonance frequency and Q value.

According to the above video picture contour correction method, when the rounding of the video signal is not so severe, and therefore when the differentiated signal in FIG. 3(B) becomes excessively large, the picture can have excessively intensified luminance at the border, deteriorating the pictur equality. Moreover, large current may be generated in the amplification circuit 7, giving damage to the output transistor. To prevent such an excess picture correction, according to the present invention, a clamping circuit consisting of resistors and diodes may be added to the circuit for amplifying differentiated signals. The clamping circuit will be explained below.

Figure 7:
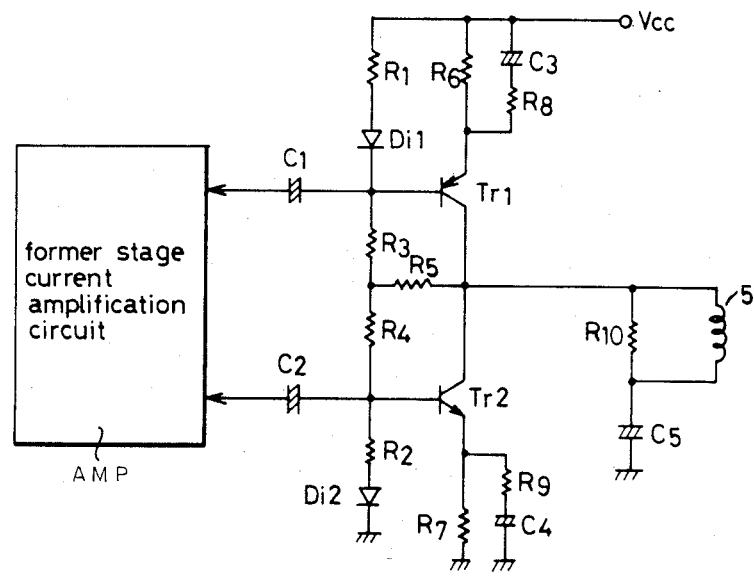
FIG. 7 shows an current amplification circuit in the final stage of the differentiated signal amplification circuit having a signal clamping circuit.

The final stage current amplification circuit of the amplifier 7 has such a construction as shown in FIG. 7 so that positive and negative differentiated signals in excess of a certain level are clamped. Referring to FIG. 7, C1 and C2 are coupling capacitors, R1, R2, R3, R4 and R5 are bias resistors, Di1 and Di2 are diodes, Tr1 and Tr2 are transistors, R6 and R7 are d.c. biasing feedback resistors for the transistors, R8 and R9 are a.c. biasing feedback resistors for the transistors, C3 and C4 are emitter bias capacitors for the transistors, R10 is a damper of the auxiliary deflection coil 5, and C5 is a direct current blocking capacitor. Accordingly, differentiated signal output from the preamplifier, if positive, is inputted through the coupling capacitor C2 into the base of the transistor Tr2. The clamping circuit composed of the resistance of resistor R2 and the diode Di2 arranged in series is connected between the base and the ground. Therefore, if the resistance of resistor R2 is smaller than the output impedance of the preamplifier, the portion of the differentiated signal exceeding a certain level is clamped. During this period, the output of the transistor Tr2 is maintained constant. Thus, the excessive current flow to the auxiliary deflection coil 5 is blocked. The negative portion of the differentiated signal controls the transistor Tr1 via the coupling capacitor C1. In this case as well, the clamping circuit composed of a resistance R1 and a diode Di1 clamps the portion of the negative differentiated signal smaller than a certain level, blocking the excessive current flow to the auxiliary deflection coil 5.

As mentioned above, if a clamping circuit is incorporated in the amplification circuit 7, it clamps the portion of the differentiated signal in excess of a certain level when an excessively large differentiated signal is transmitted from the differentiating circuit 6 due to the not-so-severe rounding in the video signal. This prevents excessive current flow to the auxiliary deflection coil 5 so that overload operation of the differentiated signal amplifier 7 and excessive correction of the picture are prevented.

If characters or symbols prepared on the receiver side are to be displayed overlapping the video picture contour, it is necessary to input signals for these characters or symbols into the luminance signal input terminal of the cathode-ray tube so that the signals are superposed on the video signal. The characters or symbols thus displayed at the picture contour have abnormal luminance and possibly may not be recognized. because the luminance is corrected over the entire picture contour according to the video contour correction method described above.

This disadvantage can be eliminated by providing a video correction terminating circuit to terminate the correction operation for border contrast of the picture for the entire or any optional portion of the video contour. The video correction terminating circuit will be explained in the following.

Figure 8:
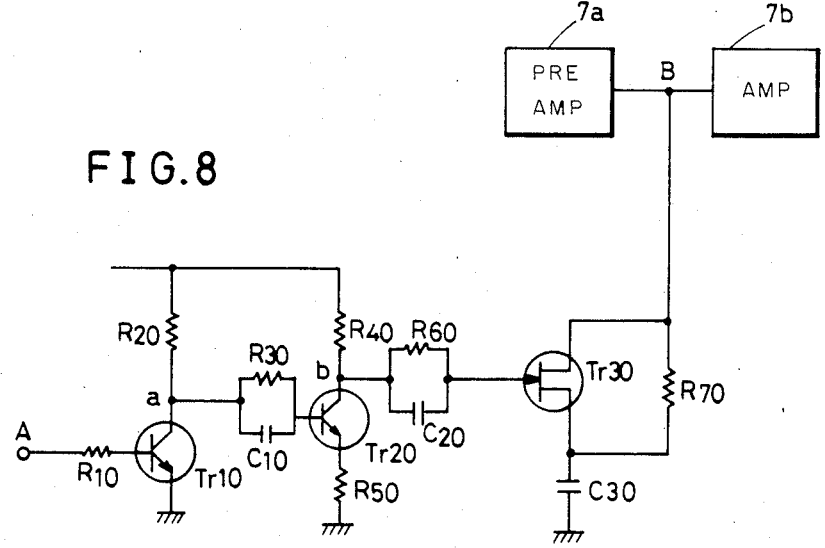
FIG. 8 is a diagram of the video correction terminating circuit provided in the video contour correction system of this invention.

The output of the video correction terminating circuit 10 shown in FIG. 8 is connected between the preamplifier 7a and the final stage current amplification circuit 7b of the amplifier 7 so that luminance correction of the video contour can be interrupted at least partially. The terminal 11 in FIG. 2 is the additional video signal input terminal to which signals for characters or symbols are inputted. Referring to FIG. 8, R10, R30 and R60 are resistors for controlling base current, C10 and C20 are speed-up capacitors, R20, R40 and R50 are waveform shaping resistors, R70 is a resistor to cause potential difference between the drain and the source of the field-effect transistor Tr30, Tr10 and Tr20 are transistors.

Figure 9:
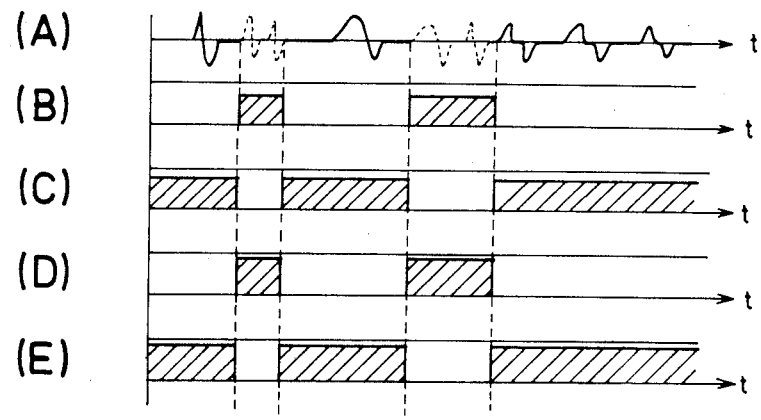
FIG. 9 is an operation explanatory view for the video correction terminating circuit used in the video contour correction system of this invention.

If it is necessary to partially interrupt the luminance correction operation, for example, in the portion of the picture contour where the signals for characters or symbols inputted through the additional video signal input terminal 11 are superimposed on the video signal, a square pulse video correction terminating signal shown in FIG. 9(B) must be inputted to the input terminal A of the video correction terminating circuit shown in FIG. 8 according to a correspondingly constructed program loaded in a microcomputer. The reference numerals 7a and 7b in FIG. 8 donate the preamplifier and the final stage current amplifier respectively of the amplifier 7 for differentiated signals shown in FIG. 2. The output terminal B of the preamplifier 7a outputs a signal as shown in FIG. 9(A), which is proportional to the differential waveform of the video signal shown in FIG. 3(B). The video correction terminating signal inputted from the terminal A is reversed by the input step transistor Tr10 and outputted from the output terminal a as such a signal as shown in FIG. 9(C). Then, the signal is amplified and reversed in the amplifying transistor Tr20 and taken out at the output terminal b as a gate signal proportional to the input signal, as shown in FIG. 9(D). The gate signal is inputted into the gate terminal of the field-effect transistor Tr30 which is a switching element. Owing to this gate signal, the impedance between the drain and the source of the field-effect transistor Tr30 is maintained virtually zero only while the video correction termination signal is at high level, as shown in FIG. 9(E). The video correction differentiated signal outputted, during this period, from the preamplifier 7a of the differentiated signal amplifier 7 is shortcircuited so that the luminance correction operation for the picture contour is partially interrupted.

Thus, correction operation for luminance of the entire or partial video contour can be terminated as described. When characters or symbols are to be displayed, superimposed on the border of the picture, the luminance correction is interrupted only at the superposing section so that the characters or symbols are easily recognized on the screen.

Figure 10:
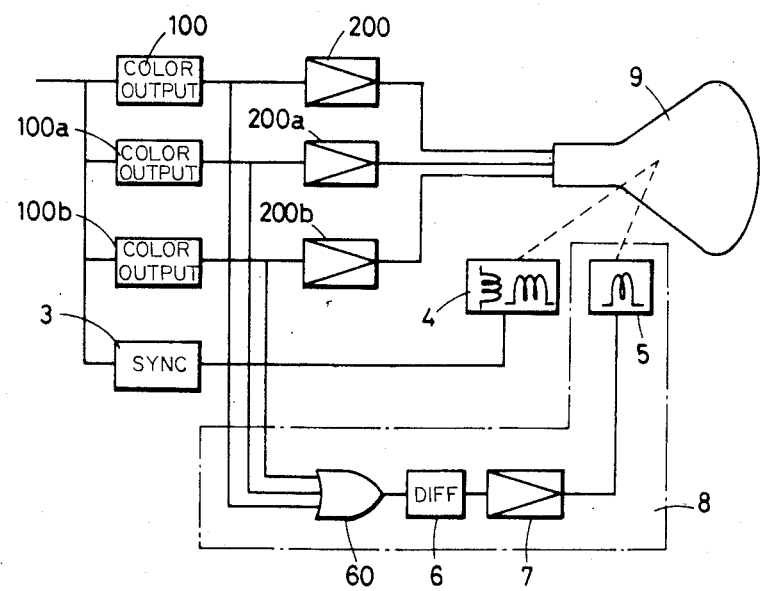
FIG. 10 is a block diagram in which the video contour correction system of this invention is applied to the video display circuit in a color video signal receiver.
Figure 11:
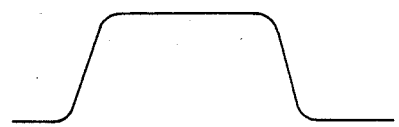
FIG. 11(A–F) is an operation explanatory view for the example in FIG. 10.
Figure 11:
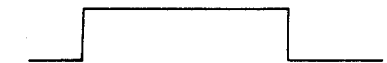
Figure 11:
Figure 11:
Figure 11:
Figure 11:

Another example of the present invention will be described with reference to FIG. 10 and FIG. 11 (A), (B) and (C). According to this example, the video contour correction system is incorporated in the video display circuit of a multi-color video signal receiver. Referring to FIG. 10, the color signal output circuits 100, 100a and 100b divide a color video signal containing a synchronizing signal into three primary color(red, green and blue) signals or generate the three primary color signals. The three primary color signals thus divided are amplified in the respective amplification circuits 200, 200a and 200b are inputted into the cathode-ray tube 9 to control the intensity of the electron beam corresponding to each of the three primary colors. Meanwhile, the synchronous deflection circuit 3 generates horizontal or vertical deflection current according to the synchronizing signal and supplies the current to the deflection coil unit 4 consisting of horizontal and vertical deflection coils. To this ordinary color video display circuit is added a color video contour correction system 8 of this invention, which consists of an auxiliary horizontal deflection coil 5, an OR circuit 60, a differentiating circuit 6 and an amplification circuit 7, as shown in FIG. 10. Three primary color signals are inputted from the color signal output circuits 100, 100a and 100b into the OR circuit 60. The differentiating circuit 6 differentiates the output signal from the OR circuit 60. The signal thus differentiated is current-amplified in the amplification circuit 7 and then supplied to the auxiliary horizontal deflection coil 5 which is arranged coaxially with the horizontal deflection coil in the parallel coil unit 4.

In this construction, if at least one of the color signal output circuits 100, 100a and 100b outputs a color signal including rounded rising edges and falling edges as shown in FIG. 11(A), the output from the OR circuit 60 is kept at a high level while the color signal exceeds a certain level, and the OR circuit 60 transmits a square save signal shown in FIG. 11(B). This signal is differentiated by the differentiating circuit 6. If the circuit constant has been appropriately selected for differentiation, the differential waveform with slightly rounded rising and falling edges as shown in FIG. 11(C) is produced as a differential output.

Explanation for the subsequent operations which are identical with those in the example shown in FIG. 2 is omitted. In FIG. 10, components identical with those in FIG. 2 are allotted with the same numerals as in FIG. 2, their explanations being omitted. The video correction terminating circuit or the signal clamping circuit described above with reference to the example of this invention may be incorporated in the multi-color video contour correction system shown in FIG. 11.

As is obvious from the foregoing explanation, according to the present invention, horizontal sweep on the cathode-ray tube is modified by adding preshoots and overshoots so that the border contrast of the picture is improved without modification of the video signal itself. This can elimiante such a complicated process as adjustment of the video signal circuit as well as a broadened picture, dimmed electron beam focus or other defects accompanied with the conventional art. Moreover, the differentiating circuit involved in the present invention can be composed only of the delay line and resistors, making the entire circuit construction of the system very simple.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A video contour correction circuit for a video display unit, comprising:
   a cathode-ray tube including horizontal deflection means for horizontally deflecting an electron beam across said tube in accordance with a horizontal deflection waveform and auxiliary deflection means for superimposing an auxiliary deflection waveform onto said horizontal deflection waveform;
   differentiating means for providing a differential waveform of a video signal; and
   amplification means for amplifying the differential waveform provided by said differentiating means, including clamping means for clamping said amplified differential waveform to a predetermined level when said differential waveform exceeds a predetermined level,
   said amplified differential waveform being applied to said auxiliary deflection means to form said auxiliary deflection waveform,
   whereby the contrast between light and dark portions of a picture displayed on said display unit is increased.

2. A video contour correction circuit as claimed in claim 1, in which said differentiating means consists of a series circuit of a resistor and a signal retardation element.

3. A video contour correction circuit as claimed in claim 1, further comprising video correction terminating means for disabling the functioning of said amplification means by interrupting the output therefrom by means of a video correction terminating signal, to thereby enable the superposition of characters or symbols on said display unit in conjunction with said picture.

4. A video contour correction circuit as claimed in claim 1, further comprising an OR circuit to which three primary color video signals are inputted, said differentiating means differentiating the output signal from the OR circuit.

5. The video contour correction circuit of claim 1, wherein said clamping means comprises a series circuit of a plurality of diodes and resistors connected between a voltage supply and ground, said clamping means being connected between said amplification means and said auxiliary deflection means.

* * * * *